(12) United States Patent
Jackson et al.

(10) Patent No.: US 7,357,364 B2
(45) Date of Patent: Apr. 15, 2008

(54) MOUNTING DEVICES

(75) Inventors: Trevor Jackson, Kirtland, OH (US); Gary Fick, Severna Park, MD (US)

(73) Assignee: Emerald Innovations, LLC, Butler, PA (US)

( * ) Notice: Subject to any disclaimer, the term of this patent is extended or adjusted under 35 U.S.C. 154(b) by 0 days.

(21) Appl. No.: 10/862,642

(22) Filed: Jun. 7, 2004

(65) Prior Publication Data

US 2005/0017144 A1 Jan. 27, 2005

Related U.S. Application Data

(60) Provisional application No. 60/476,744, filed on Jun. 6, 2003.

(51) Int. Cl.
A47F 5/00 (2006.01)
(52) U.S. Cl. ................ 248/309.1; 411/75; 52/126.1; 254/104
(58) Field of Classification Search ........... 248/231.9, 248/231.91, 188.2, 316.7, 925; 254/104; 411/75, 76, 77, 78, 79, 80; 52/126.1
See application file for complete search history.

(56) References Cited

U.S. PATENT DOCUMENTS

| | | | | |
|---|---|---|---|---|
| 620,481 | A * | 2/1899 | Moody | 411/79 |
| 780,958 | A * | 1/1905 | Palmer | 411/76 |
| 1,045,984 | A * | 12/1912 | King | 254/104 |
| 1,864,300 | A * | 6/1932 | Forrest | 411/79 |
| 1,946,949 | A * | 2/1934 | Stagg | 52/59 |
| 2,524,961 | A * | 10/1950 | Cramer, Jr. | 254/104 |
| 2,819,037 | A * | 1/1958 | Wilkin | 254/104 |
| 3,117,483 | A * | 1/1964 | Brown | 411/76 |
| 3,171,632 | A * | 3/1965 | Jines | 254/104 |
| 3,289,373 | A * | 12/1966 | William | 52/375 |
| 3,342,097 | A * | 9/1967 | Rocheleau | 411/76 |
| 3,598,013 | A * | 8/1971 | Broberg | 411/79 |
| 3,791,614 | A | 2/1974 | Scheer | |
| 3,828,511 | A * | 8/1974 | Broberg | 52/745.21 |
| 3,836,118 | A * | 9/1974 | Meyer | 254/104 |
| 4,275,637 | A * | 6/1981 | Herb et al. | 411/78 |
| 4,400,920 | A * | 8/1983 | Logsdon | 52/220.8 |
| 4,515,669 | A * | 5/1985 | Dimond et al. | 204/196.01 |
| 4,625,489 | A * | 12/1986 | Bogle | 52/712 |
| 4,707,656 | A * | 11/1987 | Marzan | 324/537 |
| 4,870,440 | A * | 9/1989 | Frost | 248/188.2 |
| 6,018,916 | A * | 2/2000 | Henry | 52/126.1 |
| 6,128,883 | A | 10/2000 | Hatzinikolas | |
| 6,273,380 | B1 | 8/2001 | Fillipp et al. | |
| 6,375,137 | B1 | 4/2002 | McQuade et al. | |
| 6,378,827 | B1 | 4/2002 | Kacines | |
| 6,497,396 | B1 | 12/2002 | Adams | |
| 6,513,772 | B2 | 2/2003 | Gary et al. | |
| 6,616,128 | B2 * | 9/2003 | Selzer | 254/104 |
| 2001/0023913 | A1 | 9/2001 | Gary et al. | |

* cited by examiner

Primary Examiner—Kimberly T. Wood

(57) ABSTRACT

Support devices are adapted for use to releasably attach mounting items to structures constructed of brick, stone, concrete or cinder block, or other comparable materials. The devices have expander and support portions. The expander portion have two inter-fitting wedge members which slidably and adjustably engage with each other for adjustable insertion and fixation within gaps, such as mortar joints between bricks, stones or blocks. The support portions removably attach to the expander portions, and have support members in the form of hooks, clips, pegs, and the like.

16 Claims, 19 Drawing Sheets ic material.
MOUNTING DEVICES

CROSS REFERENCE TO RELATED APPLICATIONS

The application claims priority to U.S. Provisional Application No. 60/476,744, filed Jun. 6, 2003, which is incorporated herein by reference in its entirety.

BACKGROUND

This application relates to support devices useful for mounting and displaying items such as décor and other items, for example strands of lighting and wreaths, on buildings and other structures. The devices are specifically adapted for mounting on portions of structures constructed with brick, stone, concrete blocks or cinder blocks, and are suitable for use both indoors and outdoors.

SUMMARY

Support devices are provided which are adapted for releasably mounting items on structure, such as structures constructed of brick, stone, concrete or cinder block, or other comparable materials. The devices comprise expander and support portions, the expander portion comprising two interfitting wedge members which slidably and adjustably engage with each other for adjustable insertion and fixation within the gaps, such as mortar joints between bricks, stones or blocks. One of the wedge members comprises a retainer for receiving a support portion. The devices further comprise a support portion which comprises a means for attachment to the expander portion and a support member which is adapted to support supported items. The support member may have any number of configurations suitable for supporting items; preferably, the support member will comprise a hook, clip or peg, for example. The devices can be made of either metal or a rigid but flexible polymeric material.

DETAILED DESCRIPTION

Support Device

Figure 1:
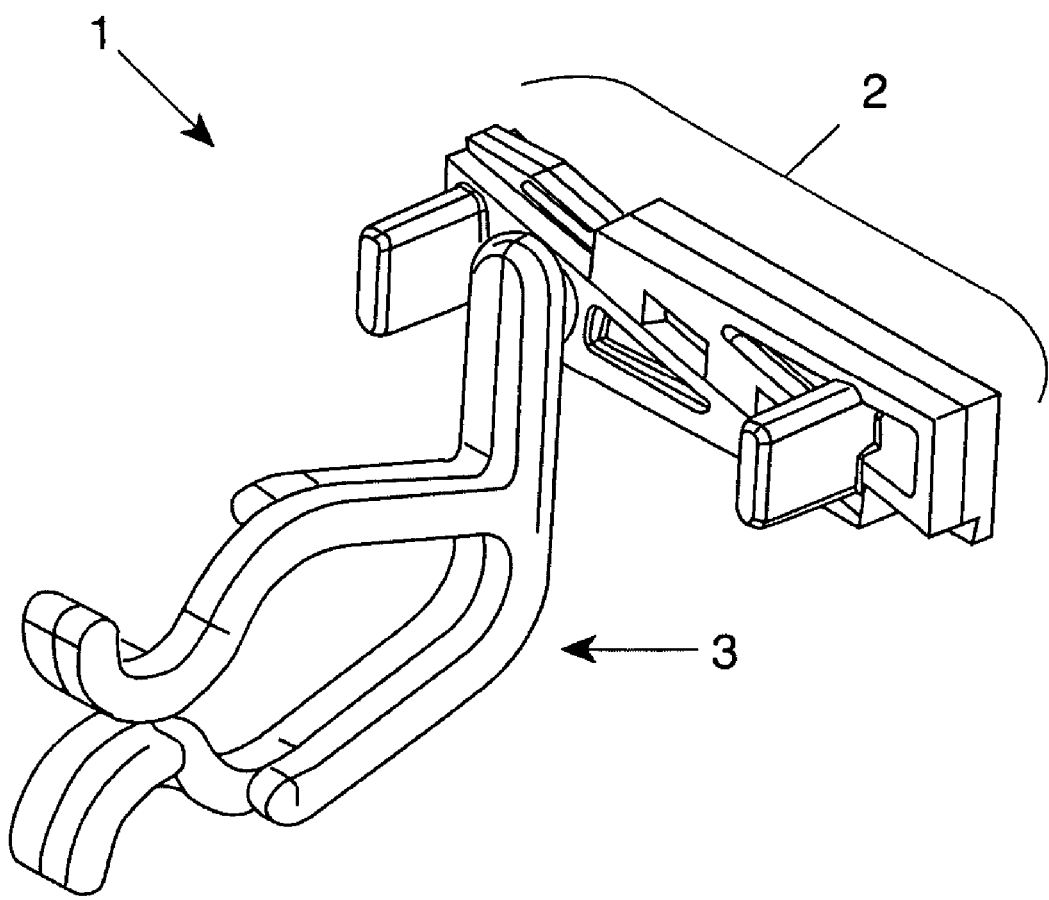
FIG. 1 is a perspective view of a preferred embodiment of the assembled support device in a minimally expanded configuration with a clip support member.
Figure 2:
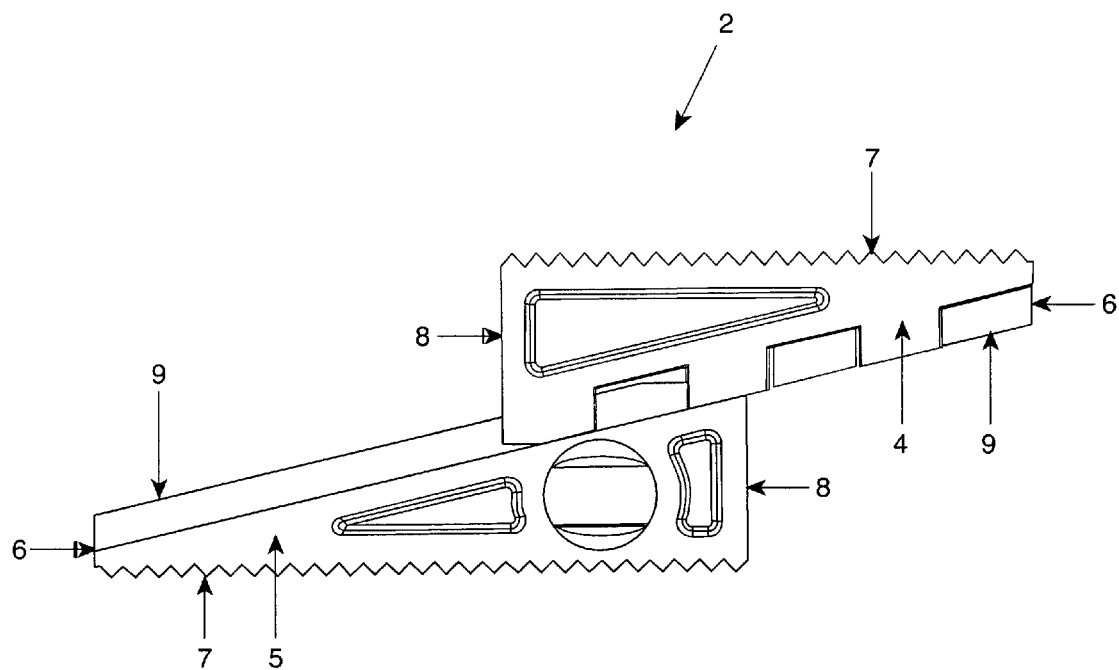
FIG. 2 is a back view of a preferred embodiment of the assembled support device in an expanded configuration.
Figure 3:
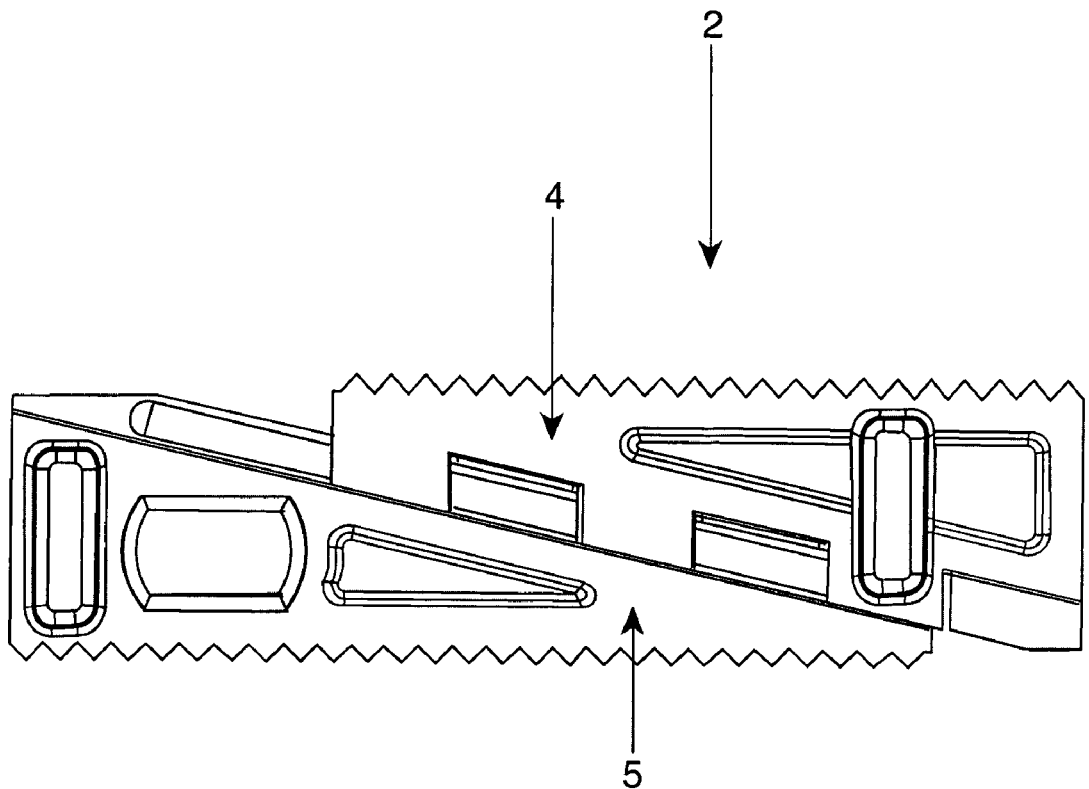
FIG. 3 is a front view of a preferred embodiment of the assembled support device in a minimally expanded configuration.
Figure 4:
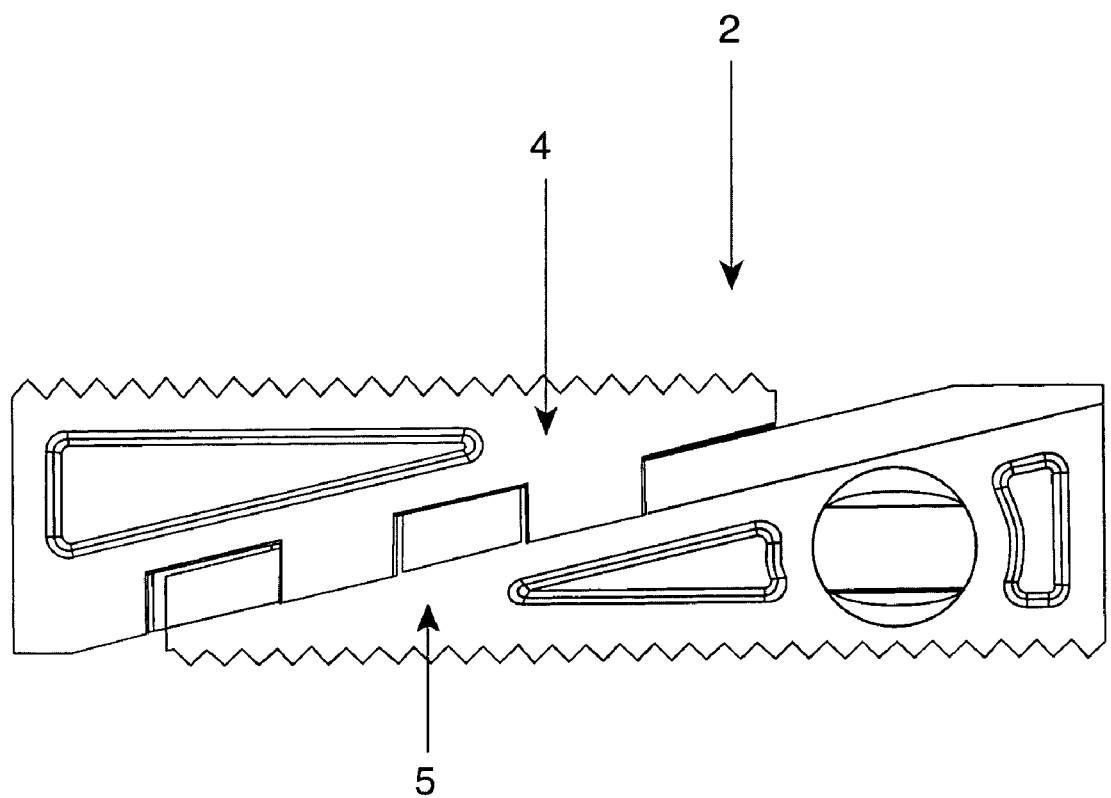
FIG. 4 is a back view of a preferred embodiment of the assembled support device in a minimally expanded configuration.

Referring to FIG. 1, in a preferred embodiment, the support device 1 comprises an expander portion 2 and a support portion 3. Referring to FIGS. 2, 3, and 4, in the depicted embodiment, the expander portion comprises an upper 4 and a lower 5 wedge member. Use of the terms "upper wedge" and "lower wedge" are for purposes of aiding in understanding the embodiments as described and set forth in herein; the relative positions of the upper and lower wedges may be switched depending on the use of the support device, such that the upper wedge member is positioned on the bottom of the support device and the lower wedge member is positioned on the top of the support device. In alternate embodiments, the wedge members may be oriented such that they are positioned in a vertical orientation. The support device is preferably constructed with flexible and durable polymeric material such as, for example, polypropylene or polycarbonate, although other materials such as metal or wood may be used. The preferred polymeric material is one that is not brittle and has good weatherability (i.e., is resistant to the effects of moisture, temperature variations, and ultraviolet light).

Expander Portion; Wedge Members

Referring to FIGS. 2-4 and the embodiments depicted therein, the wedge members 4 and 5 interfit to form an expander portion 2 of the support device 1 which, when engaged, can be slidably adjusted relative to each other to adapt various orientations. At the extreme the expander portion 2 may be in either an expanded configuration, as shown in FIGS. 2, 11, 12, and 15-19, or a minimally expanded configuration, as shown in FIGS. 1, 3 and 4. As depicted in FIG. 2, the wedge members 4 and 5 are each in the shape of an inclined plane, and have a base 7 that is defined by a length, a side 8 that is at a right angle to the base and is defined by a height and a thickness, and an incline 9, the length of which is a function of the dimensions of the base and side, and a tip 6, with the side 8 and tip 6 defining the end extremes of the incline 9. In use, the wedge members 4 and 5 are slidably engaged with one another along their respective inclines 9 in a range of positions. At one extreme of this range, the wedge members 4 and 5 are in a minimally expanded configuration and are in contact along the tip 6 extremes of their inclines 9, where the distance between their respective tips 6 is at a minimum and the distance between their respective sides 8 is at a maximum. At an intermediate position along this range, the wedge members 4 and 5 are in contact along all or a portion of their incline 9, and one or both of their respective tips 6 and their respective sides 8 are aligned. At another extreme of this range, the wedge members 4 and 5 are in an expanded configuration and are in contact along the side 8 extremes of their inclines 9, where the distance between their respective tips 6 is at a maximum and the distance between their respective sides 8 is at a minimum. In the expanded configuration, the expander portion 2 has the highest profile, while in the minimally expanded configuration, the expander portion 2 has the lowest profile. The wedge members 4 and 5 are complimentary, and in some embodiments engage with one another via one or combinations of recesses, grooves, ridges and bumps, as more fully described herein, to receive one another and maintain adjustable attachment with one another. In certain embodiments, particularly those intended for use in mortar joints, particularly brick mortar joints, the wedge members 4 and 5 have the following approximate dimensions: length of the base 7 is from about 0.75 inches to about 1.5 inches, more preferably from about 1 inch to about 1.375 inches; height of the side 8 is from about 0.25 inches to about 0.5 inches; and thickness of the side 8 is from about 0.25 inches to about 0.75 inches. In a preferred embodiment of the wedge members 4 and 5, the length of the base 7 is about 1.375 inches, the height of the side 8 is about 0.375 inches, and the thickness of the side 8 is about 0.2 inches. Of course, in other embodiments intended for use with other support structures such as cinder blocks, and other building substrates and structures, wedge members may have other dimensions suited to those uses.

Figure 5A:
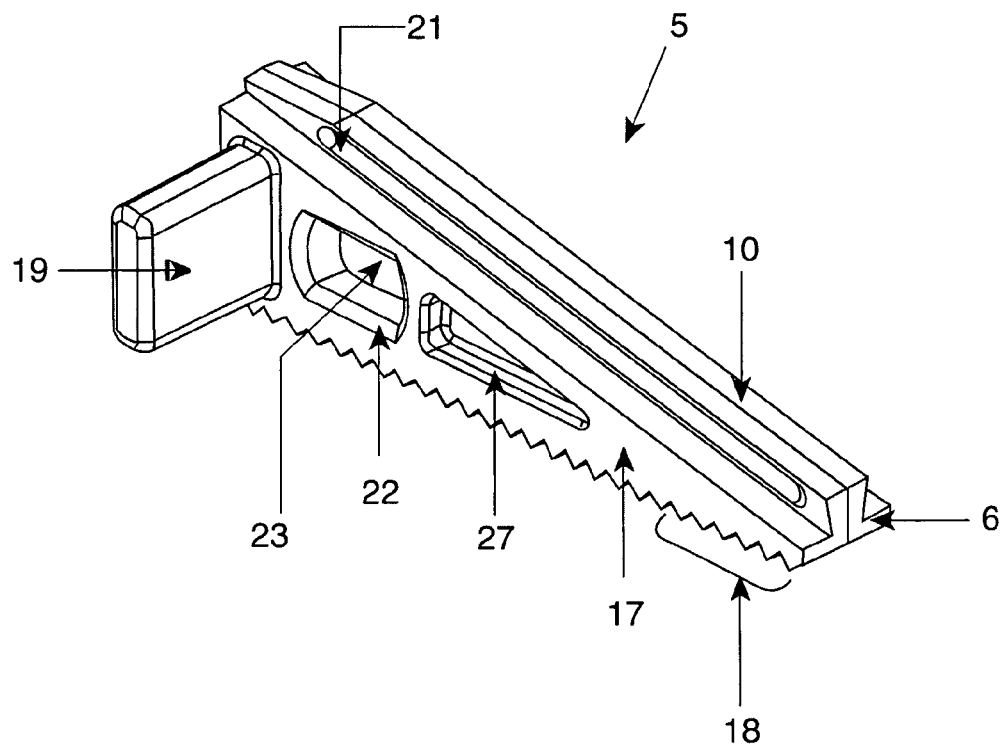
FIG. 5a is a perspective view of a preferred embodiment of the lower wedge member adapted for slidable insertion into a recess of a complementary wedge member, showing the forwardly facing aperture of the retainer on the forward face of the wedge member, and having a groove for engaging a bump on the complementary wedge member.
Figure 6:
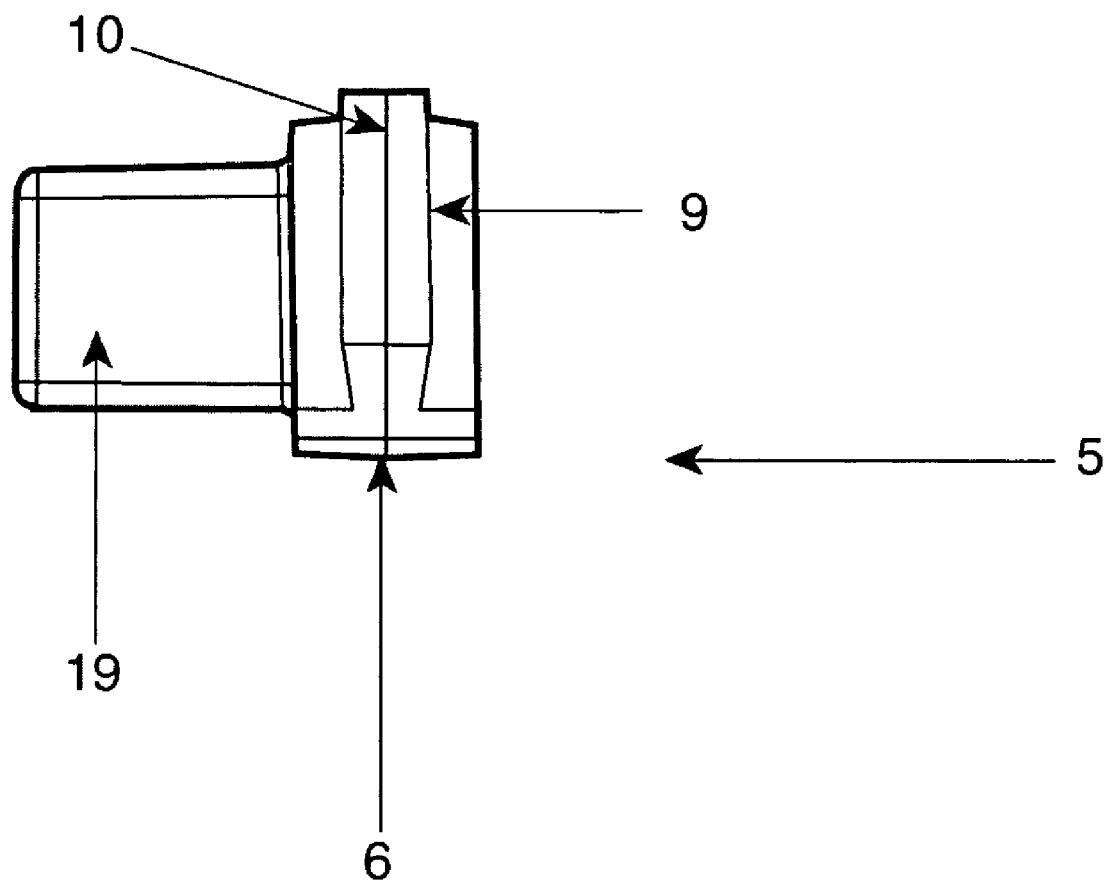
FIG. 6 is an end view of a preferred embodiment of the lower wedge member having a ridge which is adapted for slidable insertion into a recess of a complementary wedge member.
Figure 7A:
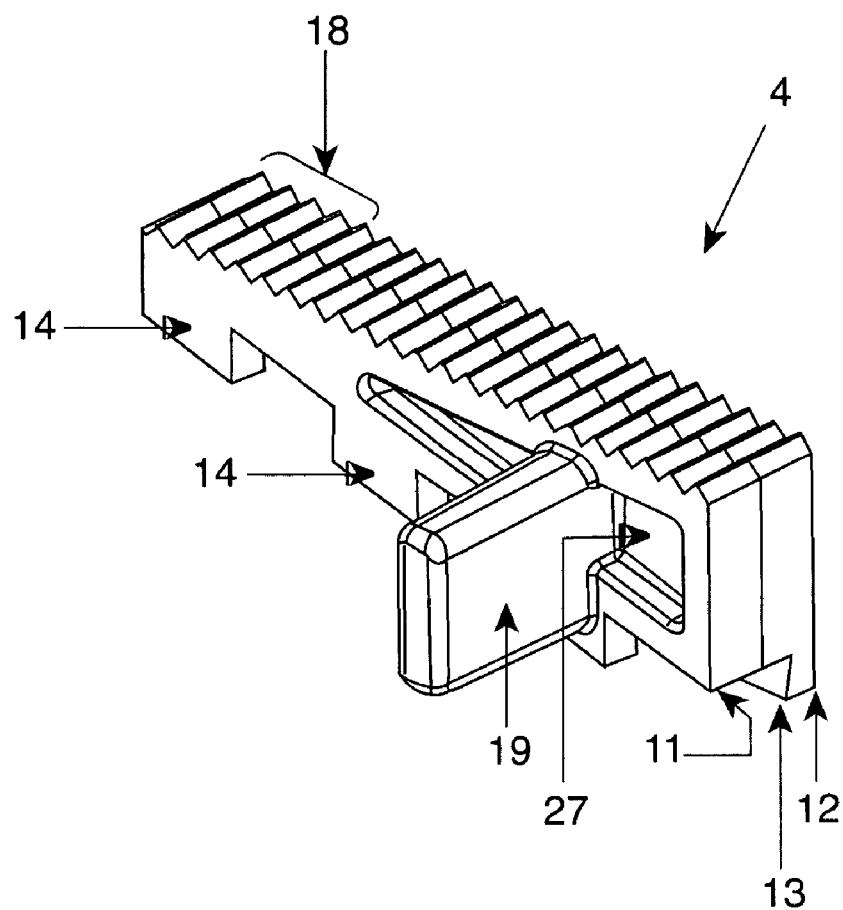
FIG. 7a is a front view of a preferred embodiment of the upper wedge member which is adapted for slidably receiving a ridge of a complimentary wedge member.
Figure 7B:
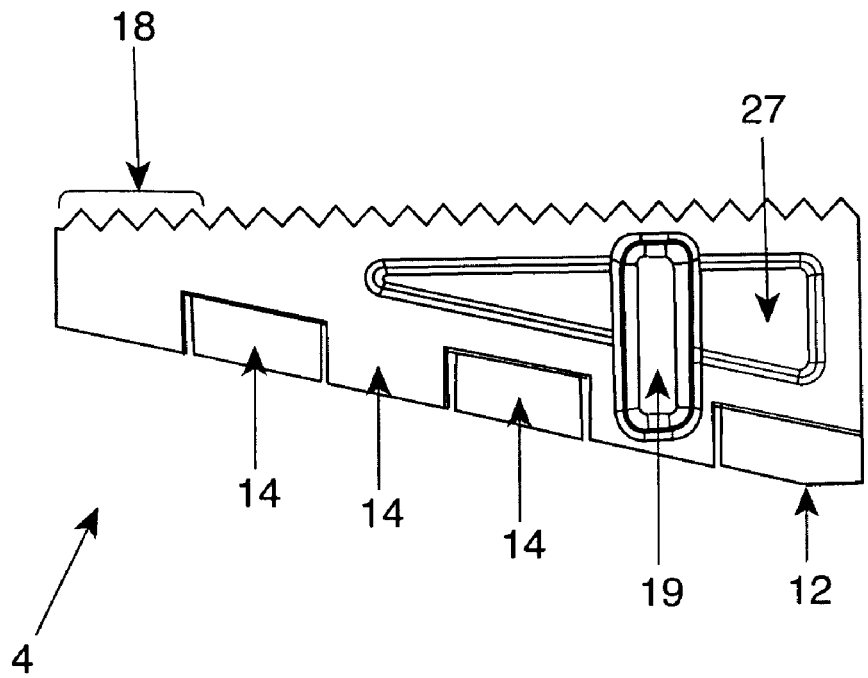
FIG. 7b is a front view of a preferred embodiment of the upper wedge member which is adapted for slidably receiving a ridge of a complimentary wedge member, having teeth which form the edges of the recess.
Figure 8:
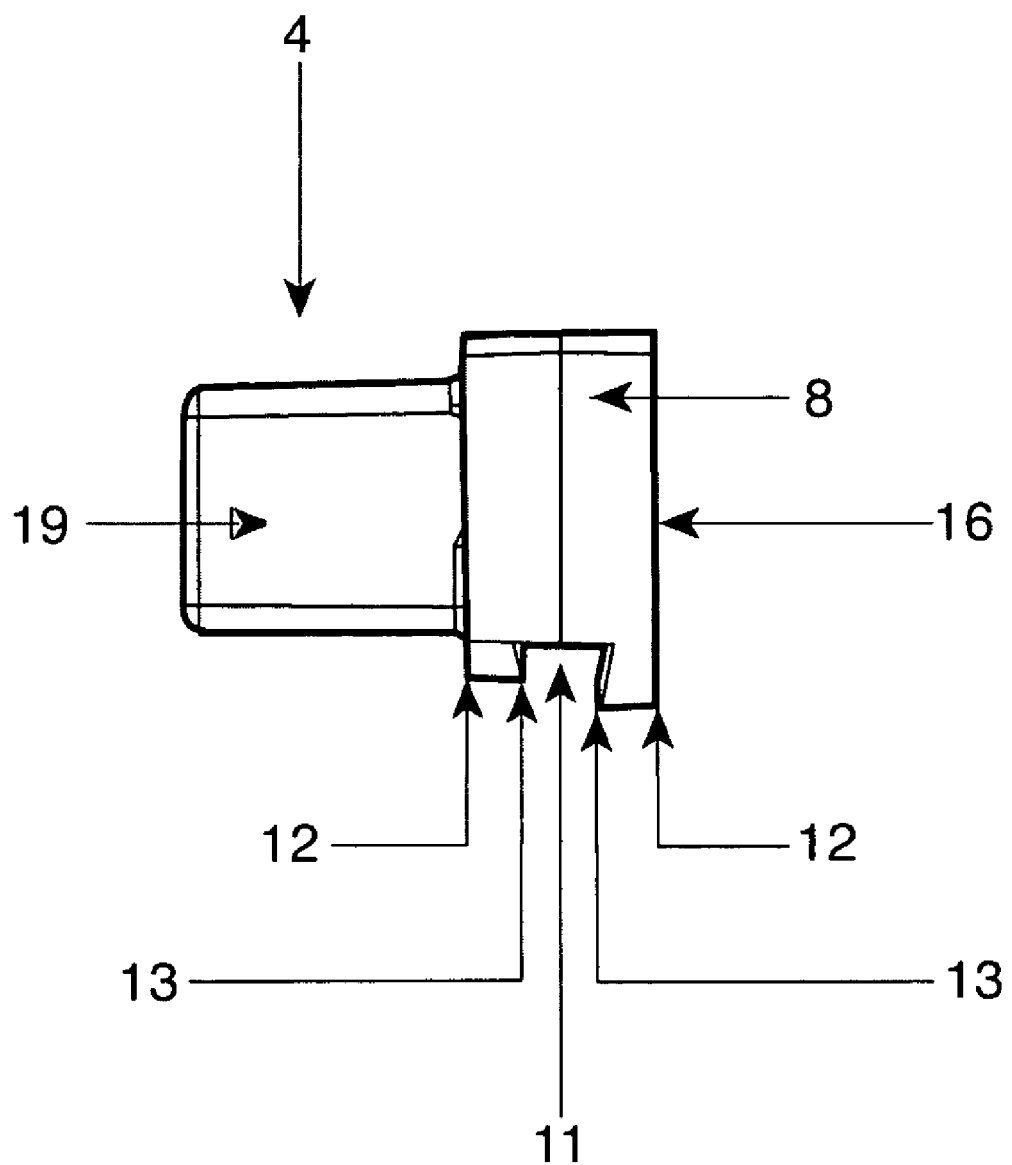
FIG. 8 is an end view of a preferred embodiment of the upper wedge member which is adapted for slidably receiving a ridge of a complimentary wedge member, and a bump for engaging a groove in a complimentary wedge member.

In one embodiment, the wedge members are engaged by insertion of a ridge on a first wedge member into a recess of a second wedge member. In this embodiment, referring to FIGS. 5a, 5b and 6, the lower wedge member has a ridge 10, which runs the length of the incline 9. In some embodiments, the ridge may be flared, as depicted in FIG. 5a. Referring to FIG. 8, the upper wedge member 4, which is complimentary to the lower wedge member 5 (not shown), has a recess 11 which runs the length of the incline 9 (not shown), and is adapted to slidably receive the ridge 10 (not shown) of the lower wedge member 5 (not shown). In this embodiment, the recess 11 preferably has an edge 12 with a slight flare 13, as shown in FIG. 8, on each side of the recess 11 for maintaining the alignment of the ridge 10 (not shown) within the recess 11. In this embodiment, as shown in FIG. 7b, the recess 11 of the upper wedge member 4 is formed by two parallel series of opposing and alternating teeth 14 positioned along length of the incline 9 (not shown) and adapted for receiving the ridge 10 (not shown) of the lower wedge member 5 (not shown) and interfitting therewith. In one embodiment teeth are useful for forming the recess due to ease of manufacture; however, the recess may be formed in a continuous wall, or may be formed from more or fewer teeth, and the teeth may be in the form of a variety of shapes such as squares, rectangles, triangles, curved ridges, and the like. Optionally, the upper wedge member 4 may have a truncated tip. The tip may be included or excluded as desired to accommodate manufacturing and materials savings requirements.

The complimentary wedge members are engaged by insertion of the ridge of one wedge member within the recess of its complementary wedge member. The wedges are moved relative to each other to the expanded configuration, as shown in FIGS. 2, 11, 12, and 15-19. In some embodiments, particularly for uses in mortar joints such as brick mortar joints, the combined height of the wedge members 4 and 5 in the expanded position is from about 0.5 inches to about 1 inch, and preferably is about 0.675 inches. The wedges are moved relative to each other to the minimally expanded configuration, as shown in FIGS. 1, 3 and 4. In some embodiments, particularly for uses in mortar joints such as brick mortar joints, the combined height of the wedge members 4 and 5 in the minimally expanded position is from about 0.25 inches to about 0.5 inches, and preferably is about 0.375 inches. Depending on the joint size, the combined height of the wedge members 4 and 5 may range from 0.25 inches or less 1 inches or more. For uses in mortar joints such as brick mortar joints, the combined height of the wedge members 4 and 5 ranges from about 0.375 inches to about 0.675 inches. Of course, in other embodiments intended for use with other support structures such as cinder blocks, and other building substrates and structures, the combined height of the wedge members 4 and 5 may have other larger dimensional ranges depending on the joint sizes specific to those uses.

Figure 9A:
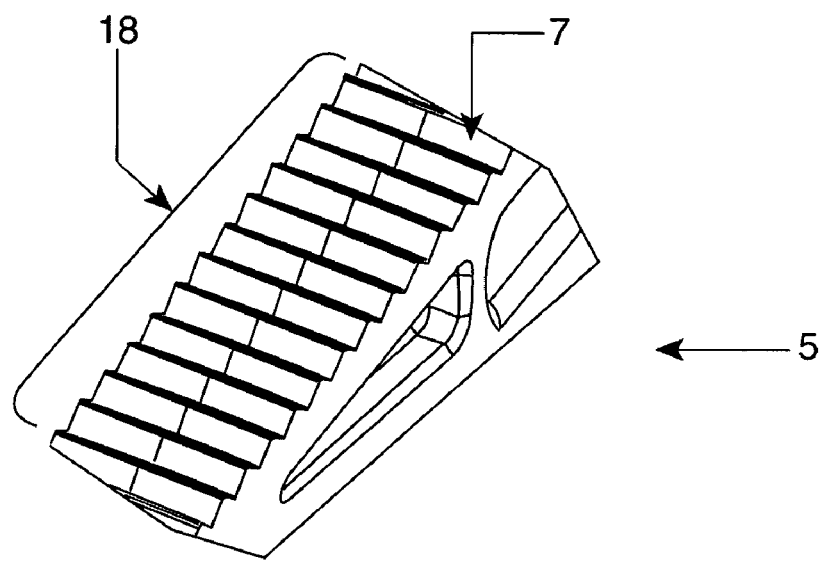
FIG. 9a is a blown up perspective view of a preferred embodiment of the lower wedge member having teeth disposed on the support structure contact surface.
Figure 9B:
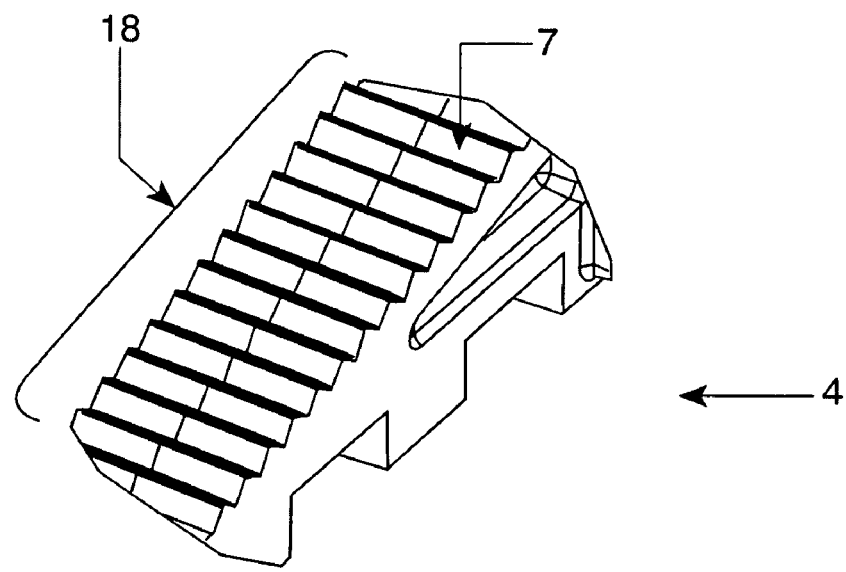
FIG. 9b is a blown up perspective view of a preferred embodiment of the upper wedge member having teeth disposed on the support structure contact surface.

In some embodiments either or both of the wedges may comprise texture on the base 7, such as teeth 18, as depicted in FIGS. 9a and 9b. As an alternative to teeth, texture on a wedge member base 7 may be in the form of bumps, etching, ridges or other structures which are molded, bonded or otherwise fixed on the base 7 surfaces. This surface texture may be useful to allow for further expansion of the support device 1, or to enhance or improve gripping of the support device 1. For uses in mortar joints such as brick mortar joints, such surface texture on one or both of the wedge members 4 and 5 may be used to accommodate mortar joints having groove heights in excess of 0.675 inches. In some embodiments, one or both of the wedge members 4 and 5 may also have texture such as recesses or teeth, or the like, disposed along the contact surfaces between the wedge members to increase friction and improve gripping between the wedges.

The expander portion 2 preferably comprises an actuation means for displacement of the wedge members 4 and 5. In some embodiments, such actuation means may be in the form of finger and thumb grips 19, as shown, for example in FIGS. 5*a* and 7*a*. Using opposing fingers, the grips may be moved toward each other to slide the wedge members 4 and 5 into the expanded configuration, and the grips may be moved away from each other to slide the wedge members 4 and 5 into the minimally expanded configuration or into some configuration between the expanded and minimally expanded configurations. In a preferred embodiment, the grips are positioned near the ends of the wedge members 4 and 5 and are disposed on the forward faces. Optionally, the tabs may be positioned at some other location of each wedge member. Other means such as gears and teeth may also be used to actuate displacement of the wedge members 4 and 5 relative to each other.

Figure 10:
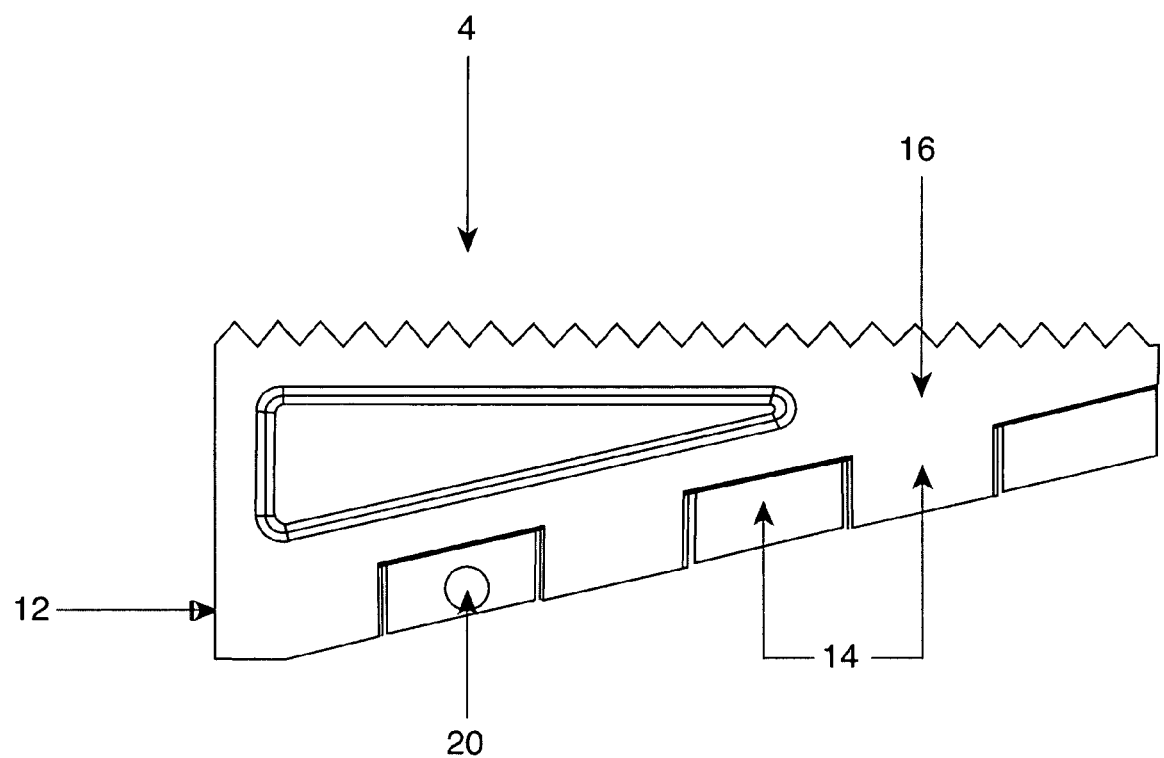
FIG. 10 is a back view of a preferred embodiment of the upper wedge member, having teeth which form the edges of the recess, and a bump for engaging a groove in a complimentary wedge member.
Figure 11:
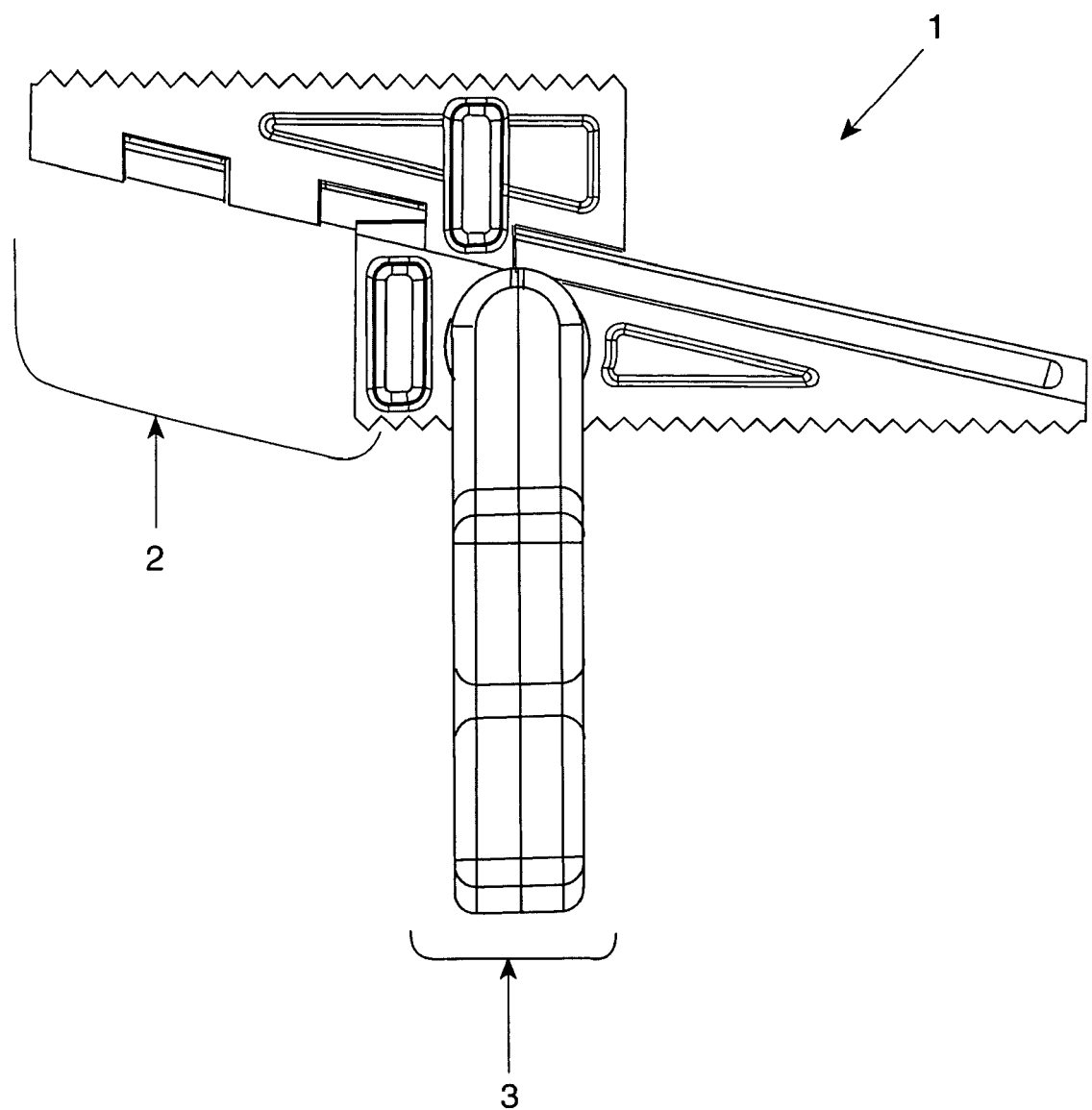
FIG. 11 is a front view of a preferred embodiment of the assembled support device in an expanded configuration with a clip support member inserted in the retainer.
Figure 12:
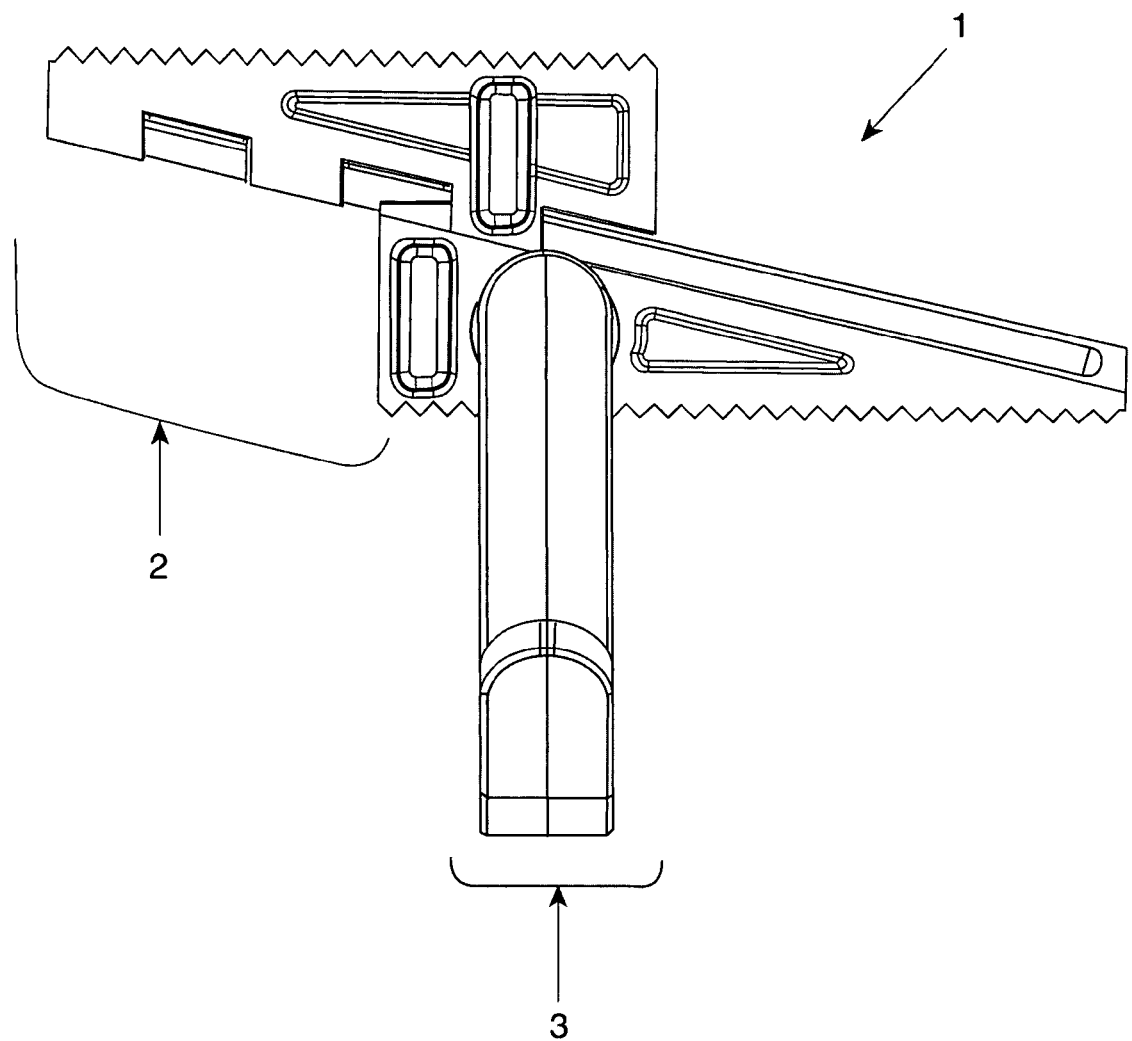
FIG. 12 is a front view of a preferred embodiment of the assembled support device in an expanded configuration with a hook support member inserted in the retainer.

In a preferred embodiment, the wedge members 4 and 5 comprise a mechanical stop to prevent disengagement at the extremes of movement between the expanded and minimally expanded configurations. Referring to FIG. 10, in one embodiment this mechanical stop comprises a projection or bump 20 or other protrusion located on the upper wedge member 4. Then, referring to FIG. 5*a*, a corresponding groove 21 located on the lower wedge member 5, wherein the groove 21 is situated along the side of the ridge 10 and opposes the bump 20 when the wedge members are engaged. The bump 20 or protrusion is located on the rear, or trailing, edge of the flare 13 of the upper wedge member 4; as shown in FIG. 10, the bump is situated on the edge of the recess 11 and positioned on the tooth 14 located just below the grip 19. As shown in FIG. 5*a*, the groove 21 runs along the length of the incline 9, preferably running only a portion of the length of the incline 9, such that the groove 21 is confined and does not extent to either end of the incline. The lower wedge member 5 may optionally comprise a groove on each side of the ridge 10, and the upper wedge member 4 may optionally comprise two bumps 20 which align with and engage each of said grooves 21 when the wedge members 4 and 5 are engaged to form the expander portion 2 of the support device 1. In a preferred embodiment, as depicted in FIG. 5*a*, the groove runs only a portion of the length of the ridge 21. In a preferred embodiment wherein the wedge members are engaged, the bump 20 glides through the groove 21 and is blocked from further movement at the extreme of the groove 21, thus preventing the wedges from slidably disengaging.

Figure 5B:
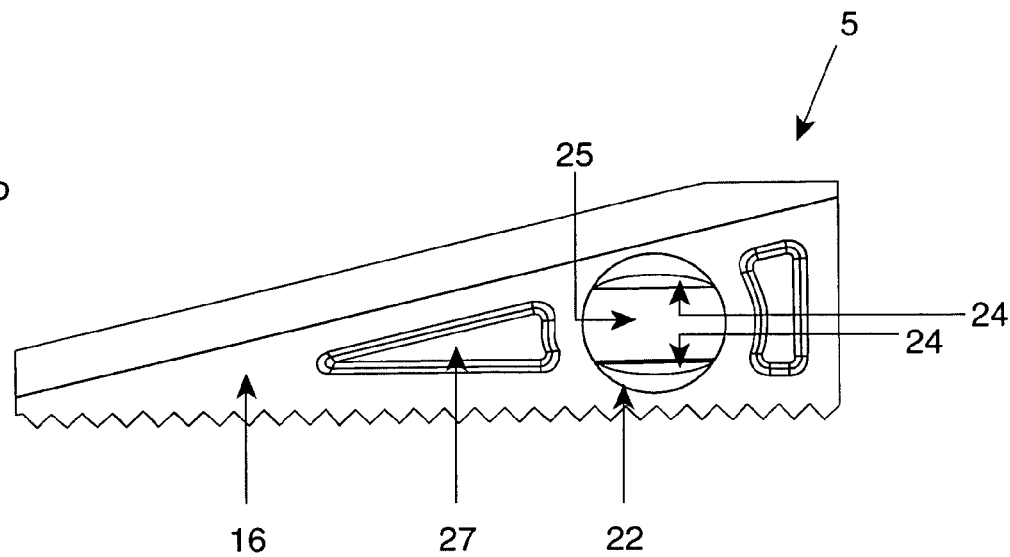
FIG. 5b is a back view of a preferred embodiment of the lower wedge member showing the aperture of the retainer, and the flanges located in the passage of the retainer for locking the rearwardly facing projection of the support member.

Referring to FIG. 5*a*, in a preferred embodiment, the lower wedge member 5 comprises a retainer 22 for receiving and retaining a support portion 3. In the depicted embodiment, the retainer 22 comprises a semi-elliptical aperture 23 for receiving the support portion 3 (not shown), and a means 24 for reversibly locking and securing the support portion 3 (not shown) to the lower wedge member 5. In some embodiments the semi-elliptical aperture 23 has dimensions that are adapted to receive a rearwardly facing projection 26 (not shown) on the support portion 3 (not shown). Referring to FIG. 5*b*, the retainer 22 comprises a circular aperture 25 disposed on the rearward face 18 at the lower wedge member 5. Disposed within the circular aperture 25 are mechanical stops 24. In the embodiment shown in FIG. 5*b*, the mechanical stops 24 are arranged in a parallel orientation that is parallel to the base 7, and project into the space between the semi-elliptical aperture 23 and the circuit aperture 25. The mechanical stops 24 serve to lock the rearwardly facing projection 26 (not shown) of the support portion 3 (not shown), as described below. Depending on the intended orientation of the support device 1 on a support structure, the semi-elliptical aperture 25 may be oriented in either a perpendicular or a parallel orientation relative to the base 7 of the lower wedge member 5.

In some embodiments the wedge members may optionally comprise partial cut outs 27 on their forward 16 and rearward 17 faces, as shown in FIGS. 5*b* and 7*b*, as may be desirable to reduce material costs.

Support Portions

Figure 13:
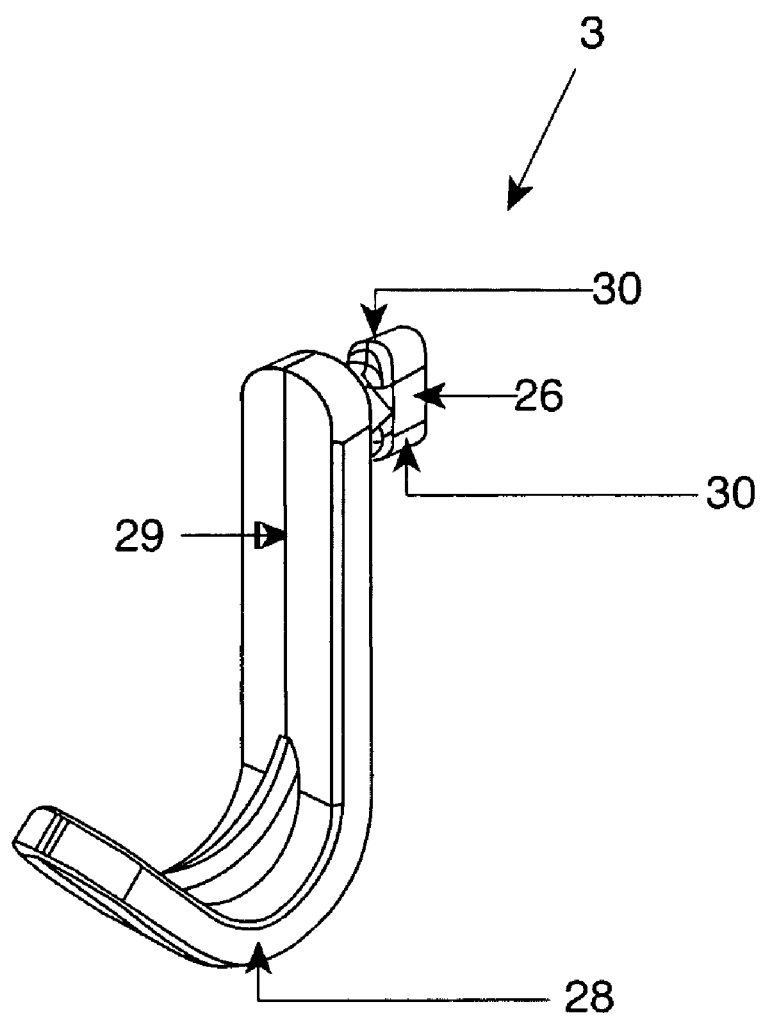
FIG. 13 is a perspective view of a support member having at its upper end a rearwardly facing projection in parallel orientation to the elongated arm for insertion into the retainer in a wedge member, and having at its lower end a forwardly facing hook; and, FIG. 14 is a perspective view of a support member having at its upper end a rearwardly facing projection in parallel orientation to the elongated arm for insertion into retainer in a wedge member, and having at its lower end a forwardly facing clip.
Figure 14:
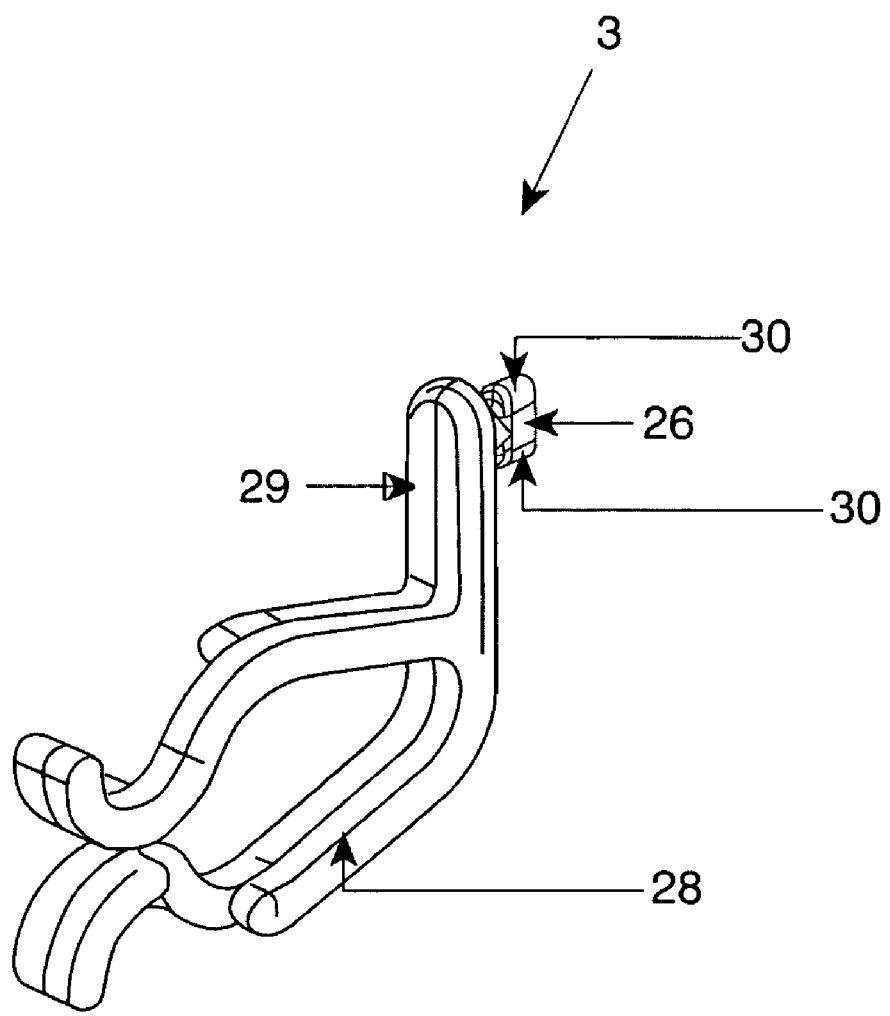
Figure 15:
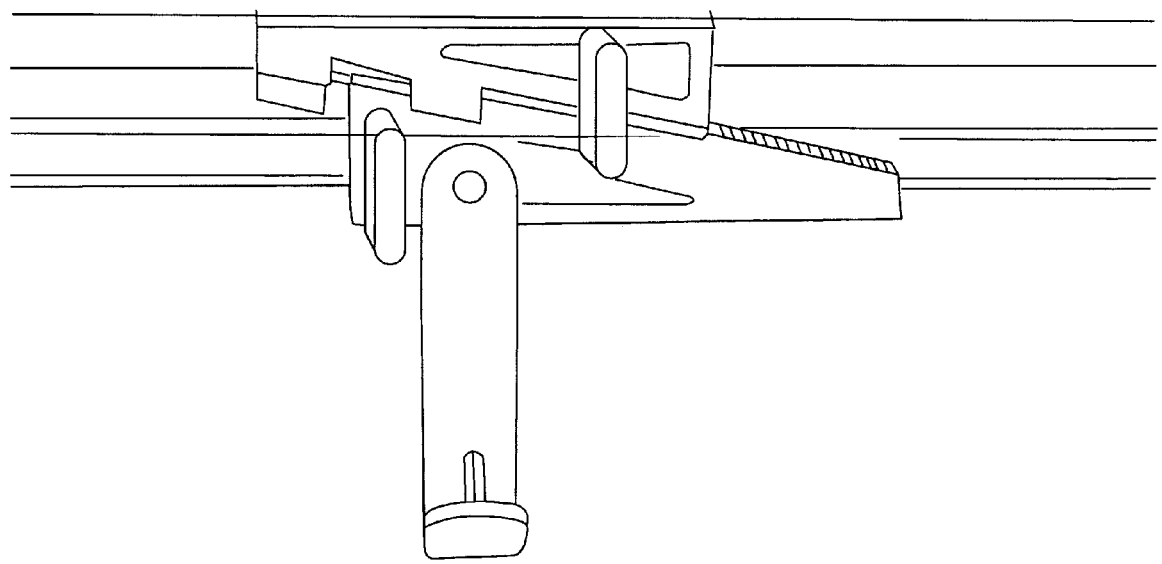
FIG. 15 shows a preferred support device of the invention as assembled in an expanded configuration installed in a mortar groove of a brick wall with an unloaded hook support member, front view.
Figure 16:
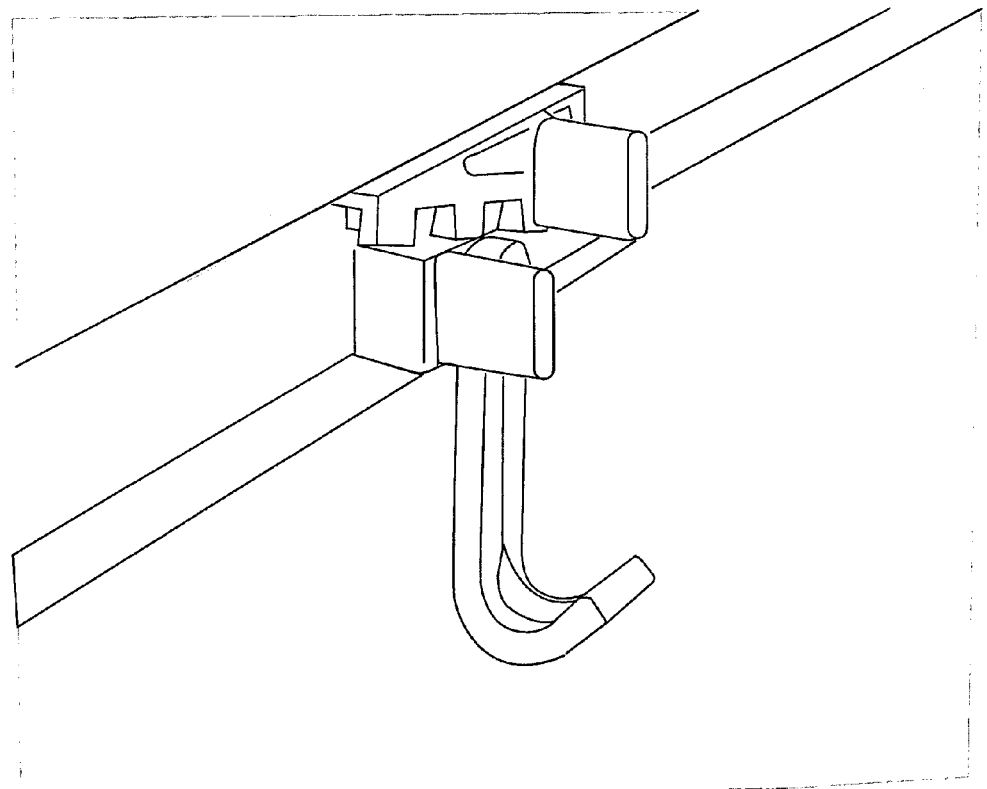
FIG. 16 shows a preferred support device of the invention as assembled in an expanded configuration installed in a mortar groove of a brick wall with an unloaded hook support member, side view.
Figure 17:
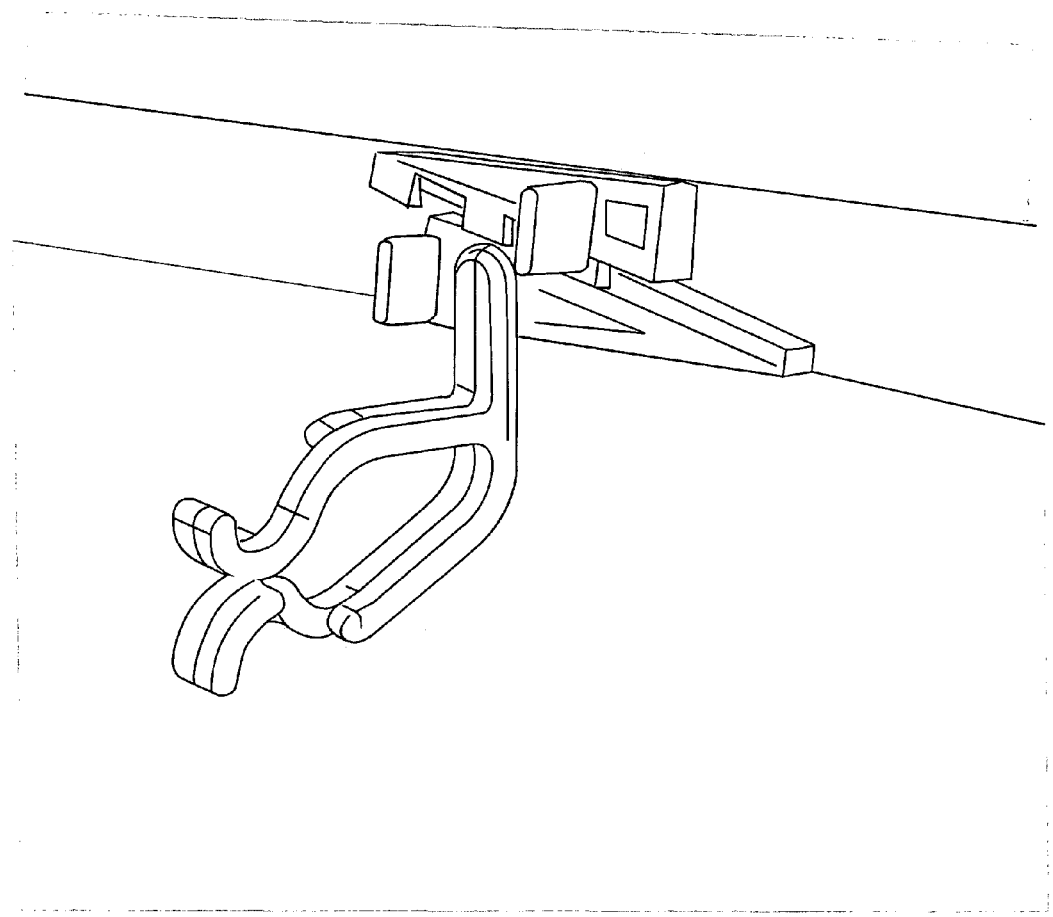
FIG. 17 shows a preferred support device of the invention as assembled in an expanded configuration installed in a mortar groove of a brick wall with an unloaded clip support member, front view.
Figure 18:
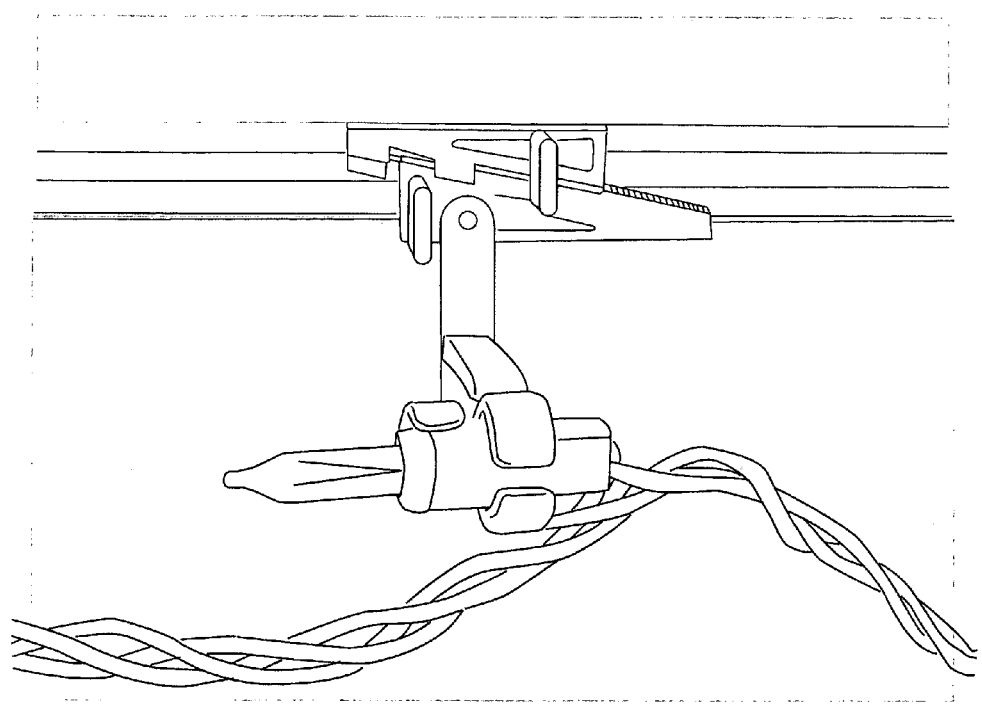
FIG. 18 shows a preferred support device of the invention as assembled in an expanded configuration installed in a mortar groove of a brick wall with a loaded clip support member, front view, supporting a strand of mini lights.
Figure 19:
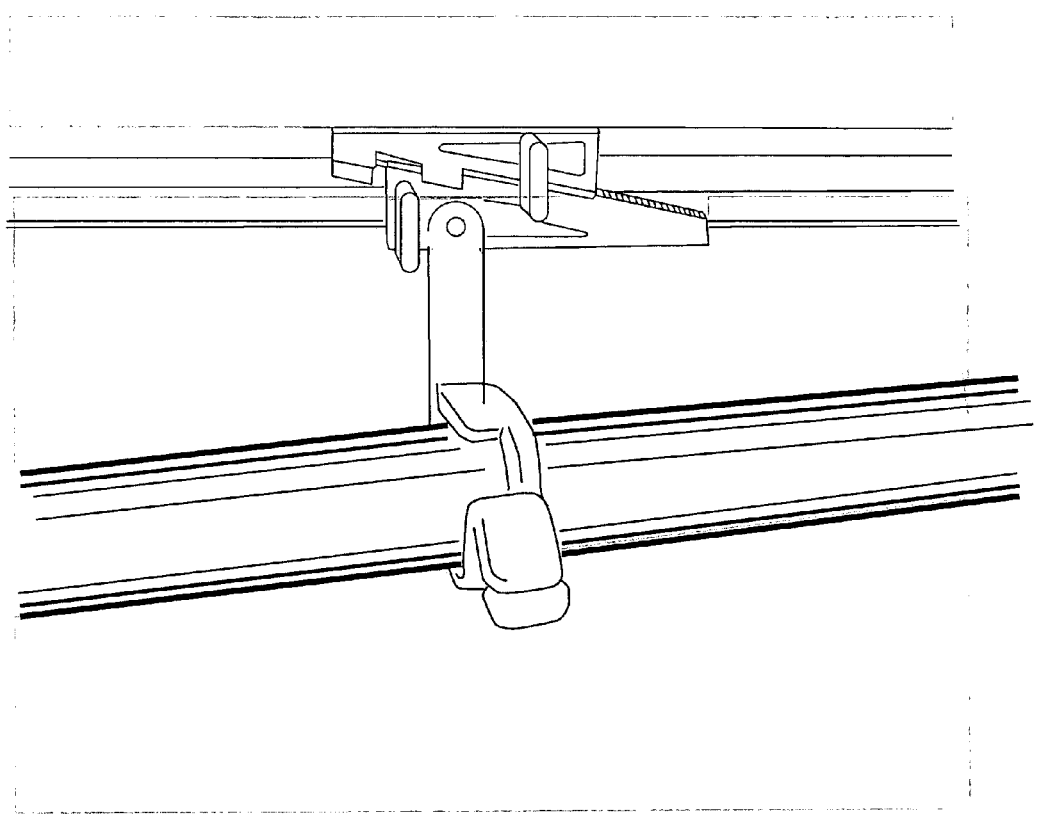
FIG. 19 shows a preferred support device of the invention as assembled in an expanded configuration installed in a mortar groove of a brick wall with a loaded clip support member, front view, supporting a light tube.

Referring to FIGS. 13 and 14, support portion 3 comprises a support member 28, and a rearward facing projection 26 having locking tabs 30 for engagement with mechanical stops 24 of the lower wedge member 5. In some embodiments support members 28 comprise a single elongated arm 29 have an upper end and a lower end. As depicted in FIGS. 13 and 14, elongated arm 29 comprises at its upper end a rearwardly facing projection 26 which is adapted for removable insertion into a retainer 22 situated on the lower wedge member 5 of the expander portion 2 of the support device 1. In the embodiment shown in FIGS. 13 and 14, the rearwardly facing projection 26 is preferably elliptical in shape, and is oriented with its long axis either perpendicular or parallel to the axis of the elongated arm 29. For engagement with the expander portion 2 of the support device 1, the rearwardly facing projection 26 is aligned in parallel with the semi-elliptical aperture 23 of the retainer 22, and inserted until it passes through the mechanical stops 24. In some embodiments, the rearwardly facing projection 26, when inserted through the semi-elliptical aperture 23, will at least partially enter the circular aperture 25. The support portion 3 is then rotated so that the rearwardly facing projection 26 is perpendicular to the semi-elliptical aperture 23, and the locking tabs 30 are engaged by the mechanical stops 24 and cannot pass back through the semi-elliptical aperture 23. In this position, the support portion 3 is "locked."

The lower end of the support portion 3 comprises a load bearing structure, or support member 28, such as a hook, as shown in FIG. 13, or a clip, as shown in FIG. 14. The load bearing structure may be an integral part of the support portion 1 (i.e., it may be formed from a single piece of material). Optionally, the load bearing structure may be formed from a separate pieces of material and may be attached to the elongated arm 29 by a screw or other attachment means that would permit the load bearing structure to be either stationary, or swivel or adjustably rotate relative to the elongated arm. Support portions 3 may be constructed with support members 28 in any number of forms or shapes that are useful for mounting items, such as hooks, clips, and pegs or other retaining or grasping implements. For example, support members 28 comprising hooks or pegs may be used to support decorative light strings, ropes, or other elongated items of lighting devices, electrical cords, and objects such as wreaths, pictures, mirrors, plaques, letters, candelabra, sconces, and the like. Support members 28 comprising clips, such as a spring clip, resilient retainer clip or the like may be used to grasp support items, particularly to support individual bulbs in lighting devices, and other objects. A differently configured hook or another load-supporting structure can be similarly secured to and supported by affixing it to the support member 28.

Support Surfaces; Installation and Use

The support device 1 is adapted for insertion and expansion inside a groove, such as is typically present in the forwardly facing recesses in the mortar spaces or joints found in brick, stone, concrete block and cinder block structures. Of course, the support device may be used in other applications where a gap exists between to structures or components. The support devices are installed as depicted in FIGS. 15-19. In these embodiments, the support devices are installed in the mortar joints between bricks. For such applications, grooves must comprise heights (distance between two edges of groove, e.g., distance between two bricks defining groove) and depths (distance from the forward surface of the support surface, e.g., front of bricks, to the forward surface of the joint material) sufficient to accept the support devices. The support surface may be, for example, an interior or exterior wall of a residence or other building, or part of another structure such as, for example, a fireplace, hearth, retaining wall, fence or mailbox. While use with brick, stone and similar walls is preferred, the support device is similarly useful for supporting an object or article from any surface having a space into which the device can be securely installed, as described below.

The support device may be installed in either a horizontally- or a vertically-oriented groove, such as a mortar space, or at some oblique angle, as in a space between adjacent, irregularly shaped rocks or the like. The expander portion 2 of the support device 1 is first placed in the groove in the minimally expanded configuration, with the bases 7 of the wedges parallel to the edges of the groove. If the support device 1 is installed in a horizontal groove, the wedge member comprising the retainer is preferably located on the bottom of the groove. The wedges are then displaced using the actuation means to expand the device up to an expanded configuration, until it is firmly locked into the groove. Optionally, if the device does not lodge in the groove in the expanded configuration, it may be removed and the teeth or overmolded cushions may be applied to the base of one or both wedges. The device may then be reinstalled as described above. No further adjustment is required to lock the device into place. The support portion is then inserted into the retainer as described above, and is ready to accept support items. The devices are removed by first removing the support item, then removal of the support portion, then removal of the support device which is achieved by displacement of the wedges toward the minimally expanded position.

Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

What is claimed is:

1. A support device comprising,
   an expander portion comprising a first and a second wedge member, each wedge member being higher than wide and longer than high, and having forward and rearward faces, a base, a side, a tip, and an incline surface adjacent at a first end with the side and adjacent at a second end with the tip, the wedge members being slidably engageable with one another along their incline surfaces through a range of configurations, such that at one extreme only a portion of the incline surfaces adjacent to the first ends with the sides are in contact and at a second extreme only a portion of the incline surfaces adjacent to the second ends with the tips are in contact, the expander portion having an actuation means disposed on at least one of the first and second wedge members for displacement of the wedge members, and the expander portion having at least one mechanical stop comprising at least one projection located on one wedge member and at least one depression located on the other wedge member that interfit to prevent the wedge members from being slidably disengaged at one or both configuration extremes;
   wherein the actuation means comprises at least one grip disposed on the forward face of each wedge member.

2. A support device comprising expander and support portions,
   the expander portion comprising a first and a second wedge member, each wedge member having forward and rearward faces, a base, a side, a tip, and an incline surface adjacent at one end with the side and adjacent at a second end with the tip, the wedge members being slidably engageable with one another along their incline surfaces through a range of configurations, such that at one extreme only a portion of the incline surfaces adjacent to the first ends with the sides are in contact and at a second extreme only a portion of the incline surfaces adjacent to the second ends with the tips are in contact, the first wedge member comprising a ridge disposed along the length of the incline, the second wedge member comprising a recess disposed along the length of the incline, wherein the recess of the second wedge member slidably receives the ridge of the first wedge member, the second wedge member comprising a retainer for interfitting with the support portion, wherein the retainer comprises at least one mechanical stop,
   the support portion comprising a rearward facing projection interfitting with the expander portion and a support member, wherein the rearward facing projection of the support portion is engaged by the at least one mechanical stop.

3. The support device according to claim 2, wherein the at least one mechanical stop is disposed within an aperture, and wherein the rearward facing projection of the support portion comprises at least one tab which engages with the at least one mechanical stop.

4. The support device according to claim 2, wherein the retainer comprises a semi-elliptical aperture on its forward face which is either parallel or perpendicular to the base of the wedge member, and a circular aperture on its rearward face, and wherein the rearward facing projection of the support portion member that interfits with the expander portion comprises a projection having a semi-elliptical shape wherein the retainer reversibly receives and interfits with the support portion.

5. The support device according to claim 1, wherein the depression for receiving the projection of the mechanical stop is a groove.

6. The support device according to claim 5, wherein the groove is disposed along the length of the incline of the wedge member and is shorter than the length of the incline.

7. The support device according to claim 4, wherein the support portion comprises an elongated arm having first and second ends, and wherein the elongated arm comprises at its first end a member that interfits with the retainer of the second wedge member and comprises art its second end the support member, and wherein the support member is selected from the group consisting of a hook, clip, and peg.

8. The support device according to claim 2, wherein the expander and support portions are made of a polymeric material, metal, wood, or combination thereof.

9. The support device according to claim 2, wherein the expander and support portions are made of a polymeric material.

10. The support device according to claim 2, wherein the recess is formed by two parallel edges that run the length of the incline of the second wedge member.

11. The support device according to claim 10, wherein the parallel edges are flared.

12. The support device according to claim 10, wherein the parallel edges are in the shape of teeth.

13. The support device according to claim 2, wherein the support portion comprises an elongated arm having first and second ends, and wherein the elongated arm comprises at its first end a member that interfits with the retainer of the second wedge member and comprises at its second end the support member.

14. The support device according to claim 2, wherein the support member is selected from a group consisting of a hook, clip, and peg.

15. The support device according to claim 1, wherein the base of one or both wedge members comprises surface texture.

16. The support device according to claim 15, wherein the surface texture is in the form of teeth, grooves, or bumps.

* * * * *